United States Patent [19]

Iizumi

[11] Patent Number: 4,850,228
[45] Date of Patent: Jul. 25, 1989

[54] PRESSURE METER

[75] Inventor: Tomomitsu Iizumi, Sohka, Japan

[73] Assignee: SMC Corporation, Tokyo, Japan

[21] Appl. No.: 92,579

[22] Filed: Sep. 3, 1987

[30] Foreign Application Priority Data

May 27, 1987 [JP] Japan ................................. 62-132729
May 27, 1987 [JP] Japan ................................. 62-82056
Jul. 23, 1987 [JP] Japan ................................. 62-185269

[51] Int. Cl.$^4$ .......................... G01L 7/08; G01L 9/06;
  G01L 19/14
[52] U.S. Cl. ........................................ 73/727; 73/431;
  73/754; 73/756
[58] Field of Search .................... 73/431, 756, DIG. 4,
  73/721, 727, 754, 753; 340/626

[56] References Cited

U.S. PATENT DOCUMENTS 4,250,759 2/1981 Vago et al. ............................ 73/754
4,615,211 10/1986 Kolm et al. ...................... 73/DIG. 4

Primary Examiner—Donald O. Woodiel
Attorney, Agent, or Firm—Burns, Doane, Swecker & Mathis

[57] ABSTRACT

A pressure meter includes a casing, a semiconductor pressure sensor disposed in the casing, a passage for introducing a fluid under pressure to the pressure sensor, a display mounted on one side of the casing for displaying a fluid pressure, and a control circuit for picking up the fluid pressure sensed by the semiconductor pressure sensor as an electric signal, for converting the electric signal to a digital signal, and for displaying the digital signal as a digital value on the display.

19 Claims, 15 Drawing Sheets

FIG.6
(a)
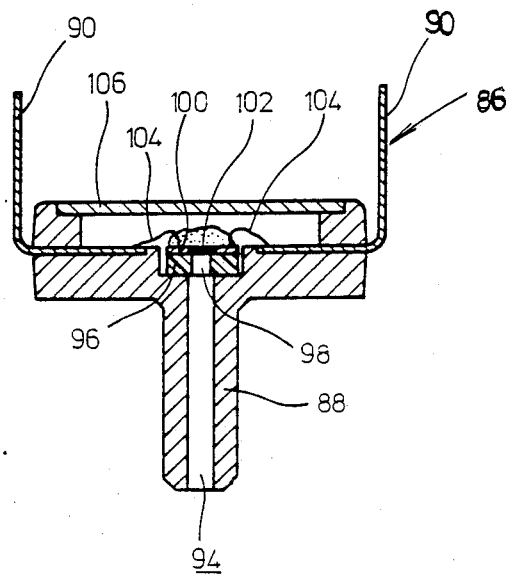
(b)
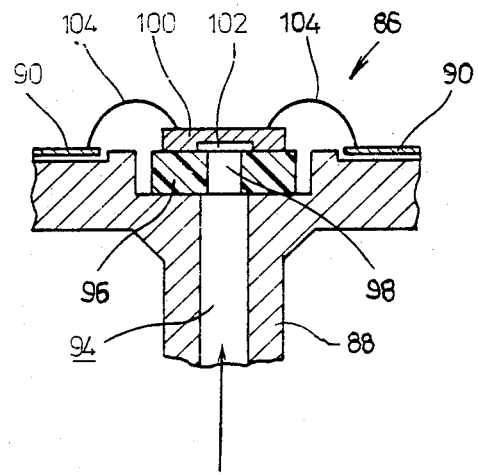

FIG.8
(a)
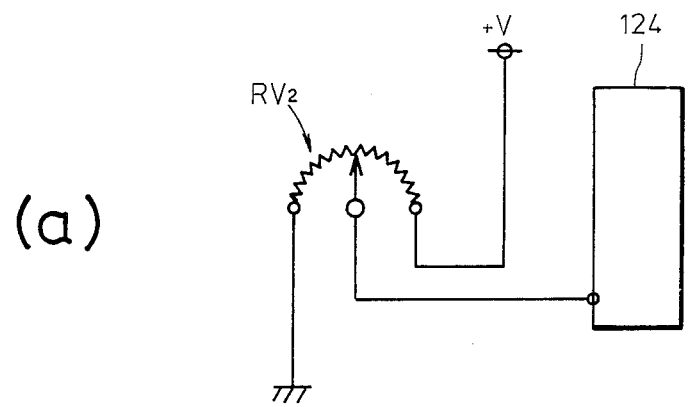
(b)
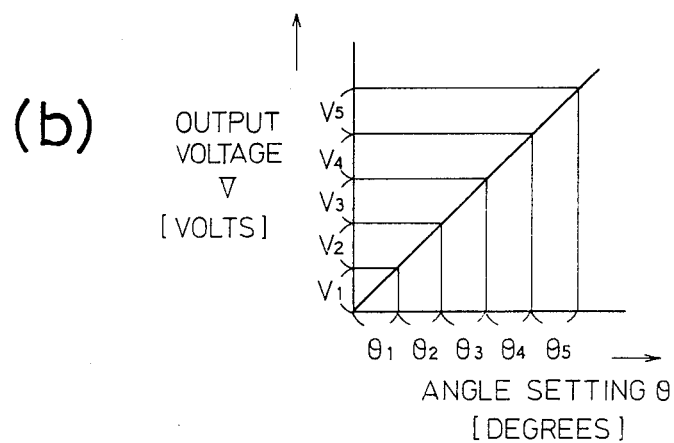

PRESSURE METER

BACKGROUND OF THE INVENTION

The present invention relates to a pressure meter, and more particularly to a pressure meter of a simple structure and a small size which is capable of digitally displaying a desired preset pressure and a preset pressure of a pressurized fluid through a simple operation.

It is customary to connect a pressure meter to a fluid pipe for checking whether a fluid under pressure, such as air under pressure, is supplied to an actuator and the actuator is operated under a normal pressure. If the fluid pressure supplied to the actuator is abnormally low or high, the actuator or various devices driven by the actuator may be damaged or cause a dangerous situation for a worker or workers working in the vicinity. Therefore, a variety of pressure meters have heretofore been developed and used in fluid supply systems. Many conventional pressure meters employ Bourdon tubes or diaphragms, and are bulky and poor in the accuracy of pressure detection.

One conventional pressure meter A using a Bourdon tube is illustrated in FIGS. 1(a) and 1(b). As shown in FIG. 1(a), a display or indicator 4 with numerals printed for displaying fluid pressures in an analog fashion is mounted in a cylindrical casing 2. A pointer needle 6 is disposed centrally in the display 4 for rotation about the axis of the casing 2. A pin 8 is mounted on the display 4 for preventing the pointer needle 6 from rotating counterclockwise beyond a certain range.

As illustrated in FIG. 1(b), a support 12 defining a passage for supplying a fluid under pressure to a curved Bourdon tube 10 is disposed in the casing 2. A base plate 14 is mounted on the support 12, and a shaft 16 coupled to the pointer needle 6 is mounted on the base plate 14. A spring 18 is connected at one end to the shaft 16, over which a gear 20 is fitted. The gear 20 is held in mesh with teeth 24 on one end of an arm 22, the other end of which is connected to a first curved rod 26. The curved rod 26 engages one end of a straight rod 28, with its other end engaging the distal end of the Bourdon tube 10. An externally threaded fitting 30 defines a fluid passage therein for supplying a fluid pressure to the Bourdon tube 10.

In use, the externally threaded fitting 30 is threaded into a fluid pressure pipe and fixed thereto. As a result, a fluid under pressure is supplied through the fitting 30 into the Bourdon tube 10. When the fluid under pressure is supplied into the Bourdon tube 10, the distal end thereof is flexed to cause the rod 28 and the curved rod 26 to displace the arm 22, whereupon the teeth 24 rotate the gear 20. The pointer needle 6 coaxially connected to the gear 20 is thus rotated clockwise to indicate the numeral corresponding to the fluid pressure in an analog manner on the display 4. The spring 18 urges the shaft 16 to counterbalance its rotation under the fluid pressure supplied into the Bourdon tube 10.

With the above construction, the Bourdon tube 10 must be hermetically joined as by brazing to the support 12. The Bourdon tube 10 itself takes up a considerable area within the casing 2. Various mechanical elements such as the spring 18, the gear 20, the curved arm 22 including the teeth 24, the curved rod 26, the rod 28 engaging the Bourdon tube 10, etc., must be assembled in the casing 2. Fine adjustment must be carried out by a skilled worker to position these elements for increased measurement accuracy.

The display 4 indicates fluid pressures in an analog manner. Such analog numerical representation together with possible reading errors fails to detect pressures with accuracy.

Heretofore, it has been a known practice to couple a pressure switch to the pressure meter so that when the supplied fluid pressure is lower or higher than a prescribed level, the pressure switch operates to stop the supply of the fluid under pressure to the pressure meter. One conventional pressure switch is shown in FIG. 2 of the accompanying drawings. The pressure switch, generally denoted by the reference numeral 32, has a piston 36 with a magnet, the piston 36 being slidably disposed in a casing 34. Displacement of the piston 36 is limited by a spring 40 with its resiliency adjustable by turning an adjustment screw 38 and a fluid under pressure introduced from a passage 42. A switching element 44 is disposed alongside of the piston 36, the switching element 44 being operable by the magnet associated with the piston 36.

Therefore, the amount of movement of the piston 36 which is displaced by the fluid pressure is detected by the switching element 44, which issues an output signal for controlling a machining apparatus, for example, to actuate or stop the same.

Where the pressure switch 32 (FIG. 2) is to be combined with the pressure meter A (FIGS. 1(a) and 1(b)), the pressure switch 32 and the pressure meter A have to be separately constructed. As a consequence, the cost of manufacture is high, and the accuracy cannot be increased substantially. The area taken up by the pressure meter A itself and the area occupied by the pressure switch 32 are so large that they will become a large obstacle to efforts to utilize the space in a factory where they are employed.

The unit of pressure generally used on pressure meter is $kgf/cm^2$. Other units of pressure are PSI, KPa, MPa, and bar. The units used vary from country to country and from field to field. It has been customary to fabricate pressure meters of different kinds to meet customer's demands for the various units of pressure.

Therefore, different pressure meters have been manufactured for the reason of different units of pressure used, though substantially the same pressures are measured by the pressure meters. This results in the production of a small quantity of pressure meters in each of many different pressure meter types. Therefore, the efficiency and cost of production of pressure meters have been low and high, respectively.

SUMMARY OF THE INVENTION

It is an object of the present invention to provide a pressure meter which employs a semiconductor pressure sensor as a pressure detecting element, is capable of digitally displaying an output signal from the semiconductor pressure sensor, and can perform the function of a pressure switch.

Another object of the present invention is to provide a pressure meter which is capable of switching between a plurality of types of unit indications for measuring substantially the same fluid pressures, and is small in size and low in cost of manufacture.

Still another object of the present invention is to provide a pressure meter which is simple in structure, can be reduced in size and cost of manufacture, and can easily be maintained or serviced for repair or the like.

A still further object of the present invention is to provide a pressure meter comprising a casing, a semiconductor pressure sensor disposed in the casing, a passage for introducing a fluid under pressure to the pressure sensor, a display mounted on one side of the casing for displaying a fluid pressure, and means for picking up the fluid pressure sensed by the semiconductor pressure sensor as an electric signal, for converting the electric signal to a digital signal, and for displaying the digital signal as a digital value on the display. The means includes means for picking up the electric signal as an analog signal, and for utilizing the analog signal as a control signal and/or an alarm signal with respect to the fluid under pressure when the analog signal is higher or lower than a prescribed value.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 6(a) and 6(b) are fragmentary crosssectional views of a pressure sensor in the pressure meter of the invention;

FIG. 8(a) is a circuit diagram of a unit switching circuit in the electric circuit shown in FIG. 7;

FIG. 8(b) is a diagram explaining operation of the unit switching circuit shown in FIG. 8(a);

DESCRIPTION OF THE PREFERRED EMBODIMENTS

Figure 1A:
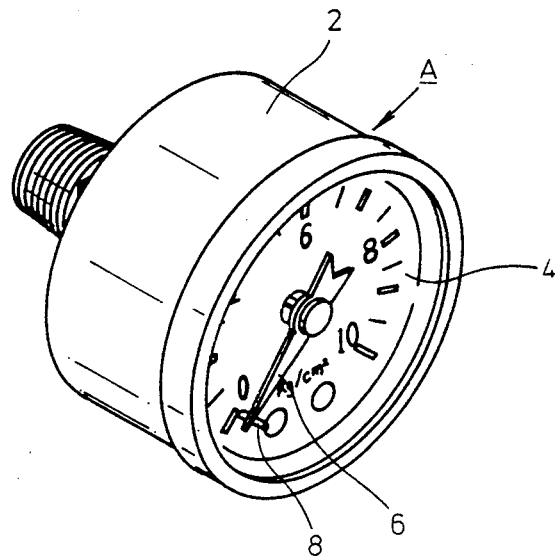
FIG. 1(a) is a perspective view of a conventional pressure meter employing a Bourdon tube.
Figure 1B:
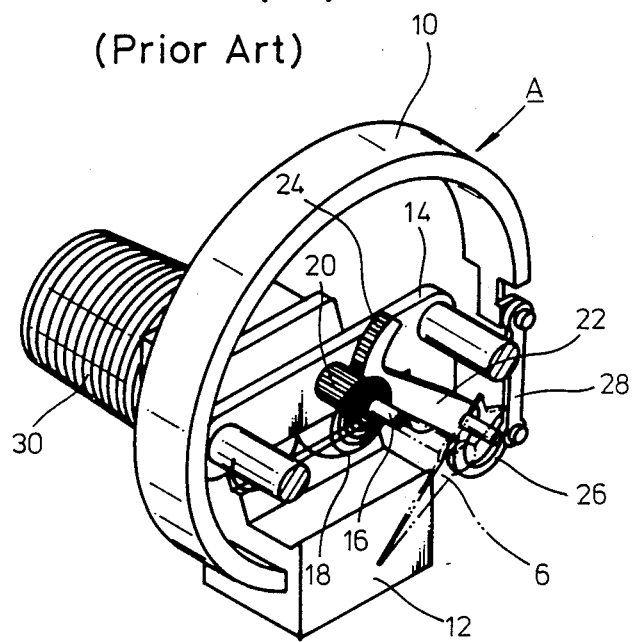
FIG. 1(b) is a perspective view of the pressure meter of FIG. 1(a), showing an internal structure thereof.
Figure 2:
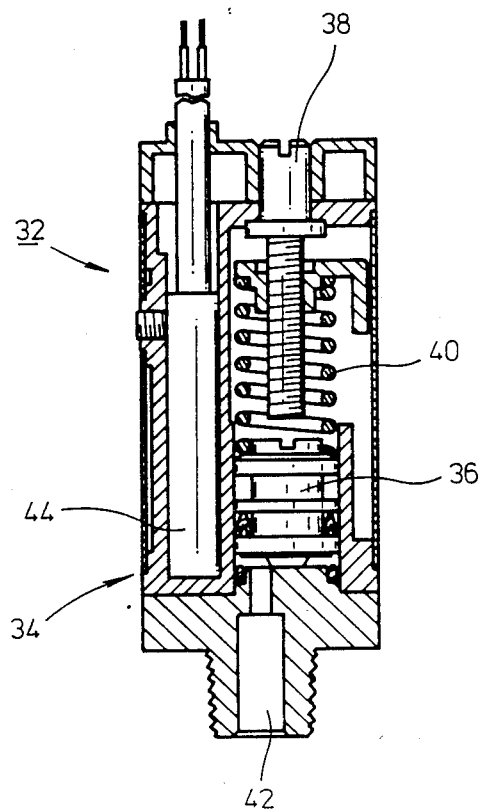
FIG. 2 is a vertical cross-sectional view of a conventional pressure switch.
Figure 3:
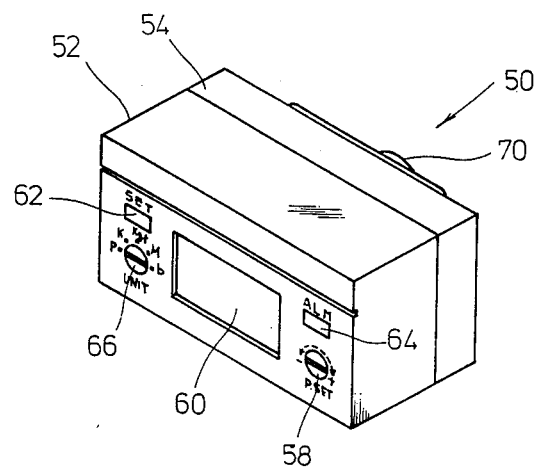
FIG. 3 is a perspective view of a pressure meter according to the present invention.

FIG. 3 shows a pressure meter, generally designated by the reference numeral 50, according to an embodiment of the present invention. The pressure meter 50 comprises a rectangular outer cover 52 and a base 54 coupled to the cover 52 for threaded engagement with a fluid pipe (not shown). The base 54 has a cylindrical fitting 70 for introducing a fluid under pressure from the fluid pipe into the pressure meter 50. The cover 52 has on its front panel a pressure setting knob 58, a digital display 60 such as a liquid crystal display, a pushbutton 62 for digitally displaying a pressure setting, a light-emitting element 64 for giving an alarm indication when the fluid is supplied under a pressure below the pressure setting, and a knob 66 for the user to select a desired unit of pressure from PSI, KPa, kgf/cm$^2$, MPa, and bar.

Figure 4:
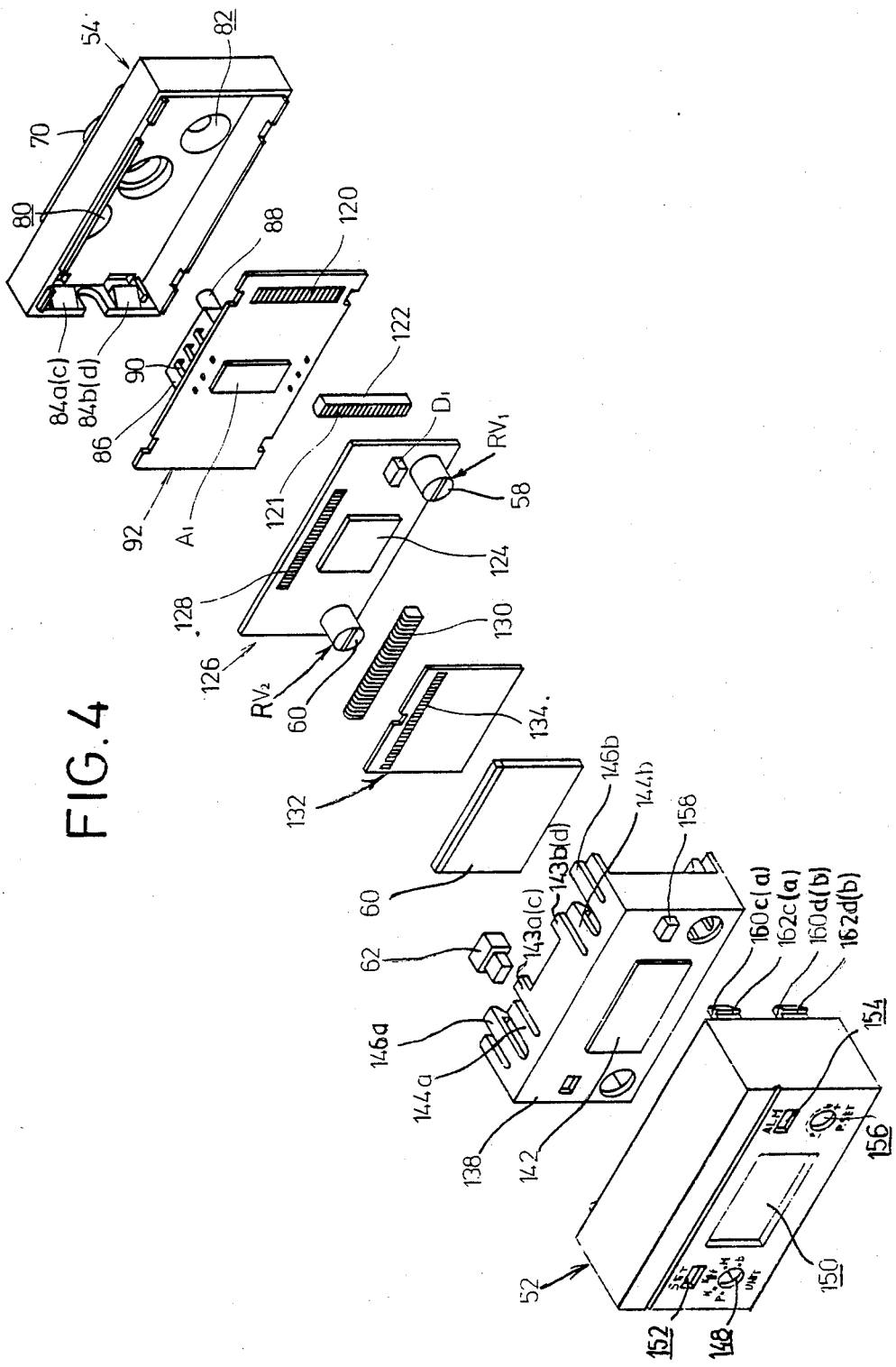
FIG. 4 is an exploded perspective view of the pressure meter of the invention.
Figure 5:
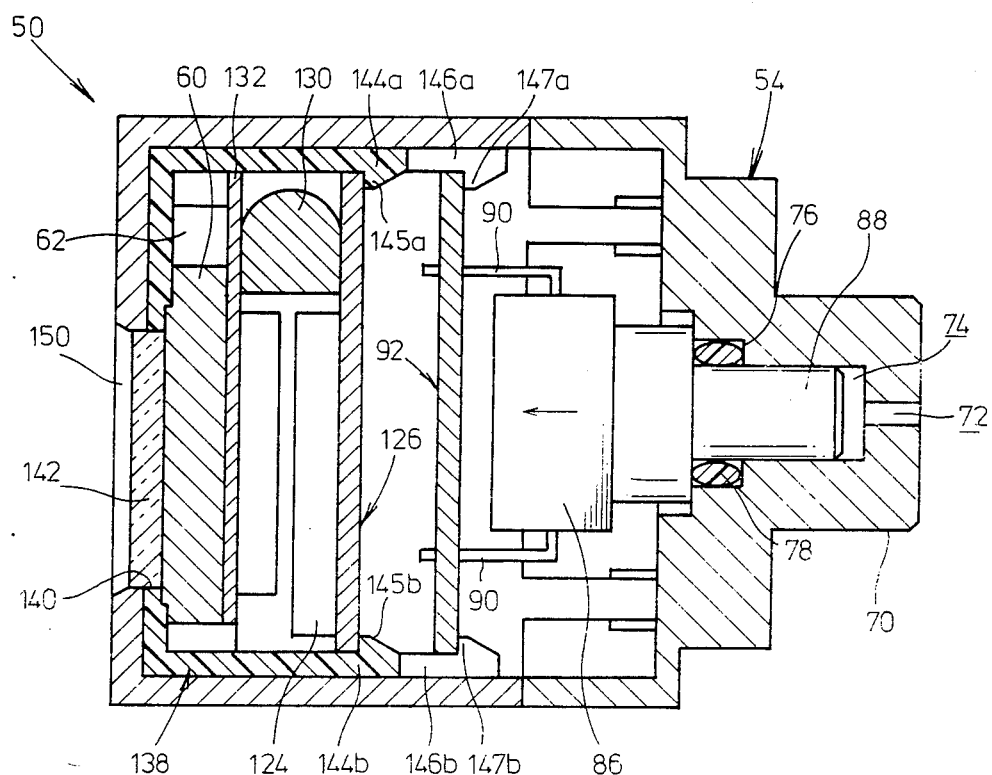
FIG. 5 is a cross-sectional view of the pressure meter of the invention.

The internal structure of the pressure meter 50 will be described below with reference to FIGS. 4 and 5. As shown in FIG. 5, the base 54 with the cylindrical fitting 70 is of an integral construction, the cylindrical fitting 70 being fittable in the fluid pipe or a hole defined in a fluid pressure device for installing the pressure meter in position and introducing a fluid under pressure. The cylindrical fitting 70 has an axial passage 72 communicating with the exterior and with a large-diameter chamber 74 defined in the base 54. A stepped portion 76 at the inner terminal end of the chamber 74 defines an annular groove in which an O-ring 78 is disposed. As shown in FIG. 4, the base 54 has holes 80, 82 defined in its bottom for securing the base 54 by inserting screws or suitable fasteners through the holes 80, 82. Locking wedges 84a through 84d are disposed on inner opposite side surfaces of the base 54 for retaining the cover 52.

A pressure sensor 86 for producing a voltage signal proportional to the pressure of a fluid supplied to the pressure meter through the fitting 70 includes a cylindrical projection 88 inserted in the chamber 74. The pressure sensor 86 is electrically connected to a first printed-circuit board 92 through an output terminal 90. The first printed-circuit board 92 supports an operational amplifier A1 for amplifying the pressure voltage signal from the pressure sensor 86.

The pressure sensor 86 is illustrated in detail in FIGS. 6(a) and 6(b). The cylindrical projection 88 has a passage 94 defined therein and communicating with the chamber 74 in the base 54. The passage 94 communicates with a passage 98 defined in a base seat 96 of glass on which a sersor chip 100 of the pressure sensor 86 is disposed. The sensor chip 100 has a chamber 102 (FIG. 6(b)) for surrounding the fluid under pressure which is supplied from the passage 98. To the sensor chip 100, there are connected leads 104 electrically connected output terminals 90 and coupled to the first printed-circuit board 92. The pressure sensor 86 has an upward opening in which a cover 106 of synthetic resin such as polyester is fixed for protecting the sensor chip 100.

Referring back to FIG. 4, a pattern connector 120 defined by a printed pattern is formed on one end of the surface of the first printed-circuit board 92 on which the operational amplifier A1 is mounted. An output signal from the first printed-circuit board 92 is supplied through the pattern connector 120, a first prismatic connector 122 with its three longitudinal surfaces surrounded substantially by a flexible printed pattern 121, and a pattern connector (not shown) on the reverse side of a second printed-circuit board 126 to a microcomputer 124, etc. On the second printed-circuit board 126, there are disposed a pressure setting variable resistor RV1, a pressure unit setting variable resistor RV2, and a light-emitting diode D1 serving as an alarm unit. A pattern connector 128 is formed on an upper portion of the second printed-circuit board 126 and electrically coupled through a second prismatic connector 130 to a third printed-circuit board 132 with which an LCD driver IC (not shown) is in contact. The third printed-circuit board 132 has a pattern connector 134 on its upper portion which is connected to a pattern conector (not shown) on the reverse side of the liquid crystal display 60, which is thus electrically connected to the pressure sensor 86. The pressure setting displaying pushbutton 62 is disposed above the second printed-circuit board 126.

As shown in FIG. 5, the first printed-circuit board 92, the second printed-circuit board 126, the third printed-circuit board 132, and the liquid crystal display 60 are surrounded by and encased as a unitary assembly in an inner casing cover 138.

The inner casing cover 138 has a display area 140 defined over the liquid crystal display 60 and in which a cover 142 for protecting the liquid crystal display 60 is mounted. The inner cover 138 has confronting locking members 144a, 144b and 146a, 146b on its upper and lower panels for fitting engagement with the printed-circuit boards. The locking members 146a, 146b are longer than the locking members 144a, 144b. The locking members 146a, 146b have fingers 147a, 147b, respectively,, on their distal ends, the fingers 147a, 147b being directed inwardly into engagement with the first printed-circuit board 92 to fix the same in position. Similarly, the locking members 144a, 144b have fingers 145a, 145b, respectively, on their distal ends, the fingers 145a, 145b being directed inwardly into engagement with the second printed-circuit board 126 to fix the same in position. The third printed-circuit board 132 is supported by engaging projections 143a through 143d on the inner cover 138.

The outer cover 52 has holes 148, 150, 152, 154 defined therein and in which the knob 66 of the pressure unit setting variable resistor RV2, the liquid crystal display 60, the pushbutton switch 62, a lens 158 of plastics contacting the inner cover 138, and the knob 58 of the pressure setting variable resistor RV1 are mounted.

The outer cover 52 has hook members 160a through 160d disposed on opposite sides thereof and having ridges 162a through 162d projecting outwardly. When the ridges 162a through 162d fittingly engage the wedges 84a through 84d, respectively, on the base 54, the hook members 160a through 160d firmly join the outer cover 52 and the base 54 to each other.

Figure 7:
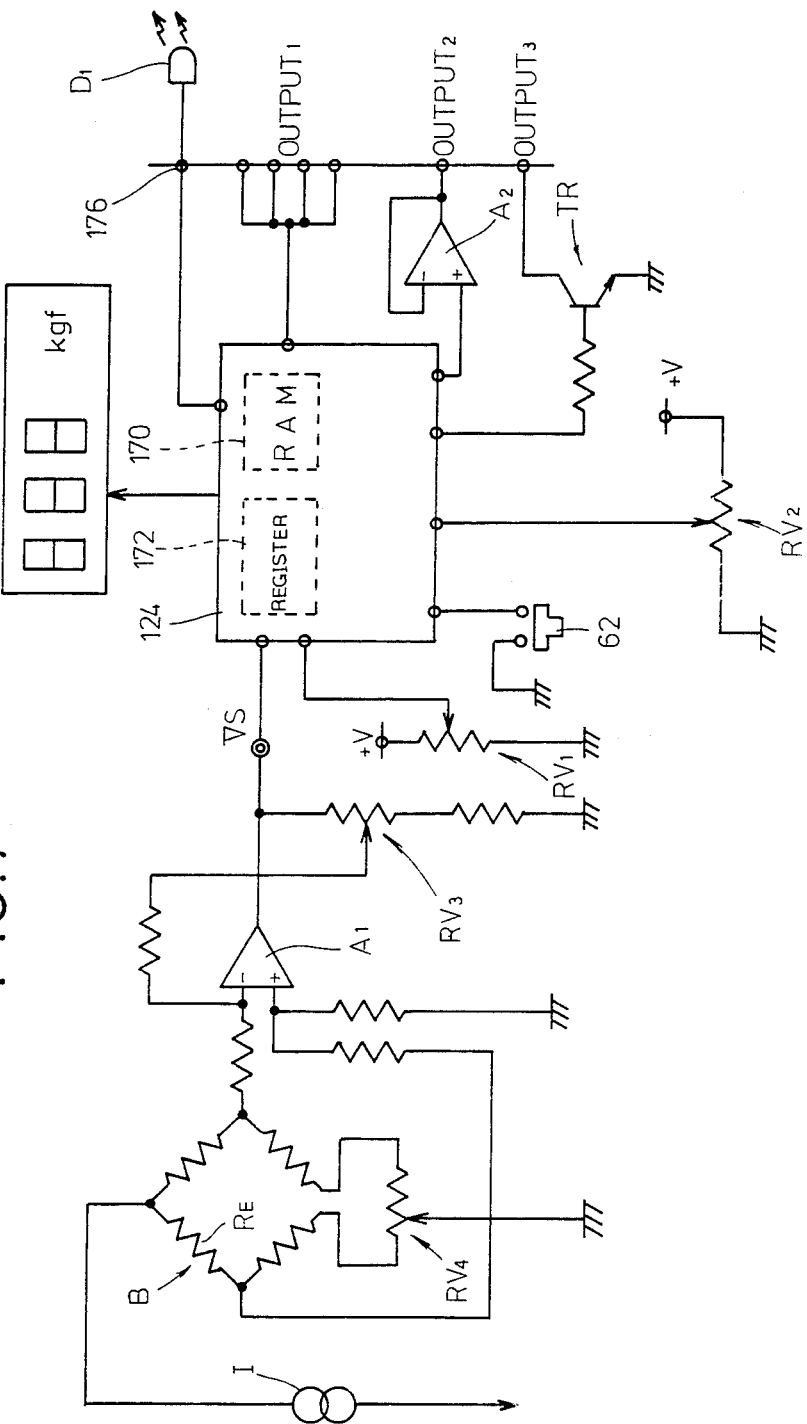
FIG. 7 is a circuit diagram, partly in block form, of an electric circuit in the pressure meter of the invention.

FIG. 7 shows an electric circuit on the first through third printed-circuit boards 92, 126, 132.

A bridge circuit B connected to a constant-current regulated power supply circuit I and including an equivalent resistance RE of the pressure sensor 86 of the sensor chip 100 has output terminals connected to the operational amplifier A1 which applies an analog output signal VS to the microcomputer 124. A variable resistor RV3 constituting an amplifying circuit with respect to the operational amplifier A1 is inserted as a feedback resistor for the operational amplifier A1. The resistors of the bridge circuit B are brought into equilibrium by means of an adjusting variable resistor RV4.

The microcomputer 145 includes a RAM 170 and a register 172. The microcomputer 145 is connected at its input and output terminals to the variable resistor RV1 adjustable from the exterior for setting a desired fluid pressure, the pushbutton switch 62 for storing, in the RAM 170, the pressure setting displayed on the liquid crystal display 60 when the displayed pressure setting reaches a desired value by adjusting the variable resistor RV1, the pressure unit selecting variable resistor RV2, an operational amplifier A2 for producing an output signal OUTPUT2 equal to the output signal VS of the operational amplifier A1, output terminals OUTPUT1 for producing the pressure displayed on the liquid crystal display 60 as a BCD serial output signal, and the light-emitting diode D1 for giving an alarm indication.

Operation and advantages of the pressure meter thus constructed will be described below.

The cylindrical fitting 50 on the base 54 of the pressure meter 50 is fitted into the fluid pipe (not shown), and the base 54 is securely fixed with respect to the fluid pipe by means of screws or suitable fasteners (not shown) inserted through the holes 80, 82. Then, the outer cover 52 housing therein the inner cover 138 with the first through third printed-circuit boards 92, 126, 132 encased therein is joined to the base 54 through interfitting engagement between the hook members 160a through 160d and the wedges 84a through 84d. The outer cover 52 can be detached from the base 54 by pressing the sides of the outer cover 52 inwardly.

Therefore, when the pressure meter 50 fails to operate, the outer cover 52 may quickly and easily be detached from the base 54 for smooth and efficient replacement of a malfunctioning component.

Then, the pressure unit selecting knob 66, i.e., the variable resistor RV1, is adjusted from the exterior to set a desired fluid pressure. The variable resistor RV4 is also adjusted so that the bridge circuit B produces an output signal of 0 value.

FIGS. 8(a) and 8(b) show the manner in which the pressure units on the pressure meter are selected.

FIG. 8(a) shows a pressure unit switching circuit which schematically illustrates the pressure unit setting variable resistor RV2. One of the fixed terminals of the pressure unit setting variable resistor RV2 is connected to a power supply $+V$, whereas the other fixed terminal is grounded. The variable resistor RV2 has a slidable terminal connected to the input terminal of an A/D converter in the microcomputer 124. The angle setting $\theta$ of the variable resistor RV2 and the output voltage V therefrom are related to each other as shown in FIG. 8(b).

More specifically, the graph of FIG. 8(b) has a horizontal axis indicating the angle setting $\theta$ and a vertical axis indicating the output voltage V. Angle settings $\theta 1$ through $\theta 5$ correspond respectively to pressure units PSI, PKa, kgf/cm$^2$, MPa, and bar. By adjusting the variable resistor RV2, output voltages V1 through V5 are selectively applied to the A/D converter in the microcomputer 124, from which the coverted values are introduced into the RAM 170. The output voltage V introduced into the RAM 170 and a reference voltage written in a ROM or the like (not shown), e.g., a voltage having a threshold level at 1/2 of the output voltage, are compared with each other, and a pressure unit setting dependent on the threshold level is displayed on the display 60. Thus, the pressure units are successively switchable or selectable by adjusting the variable resistor RV2. Although not shown, the power supply for the bridge circuit B, the microcomputer 124, and other circuits may be a battery.

After the above preparatory procedure, a fluid under pressure such as air is introduced into the fluid pipe. As a result, the bridge circuit B is brought out of equilibrium, developing a differential voltage across the output terminals thereof which is applied to the operational amplifier A1. The amplified output signal VS from the operational amplifier A1 is then introduced into the microcomputer 124.

Figure 9:
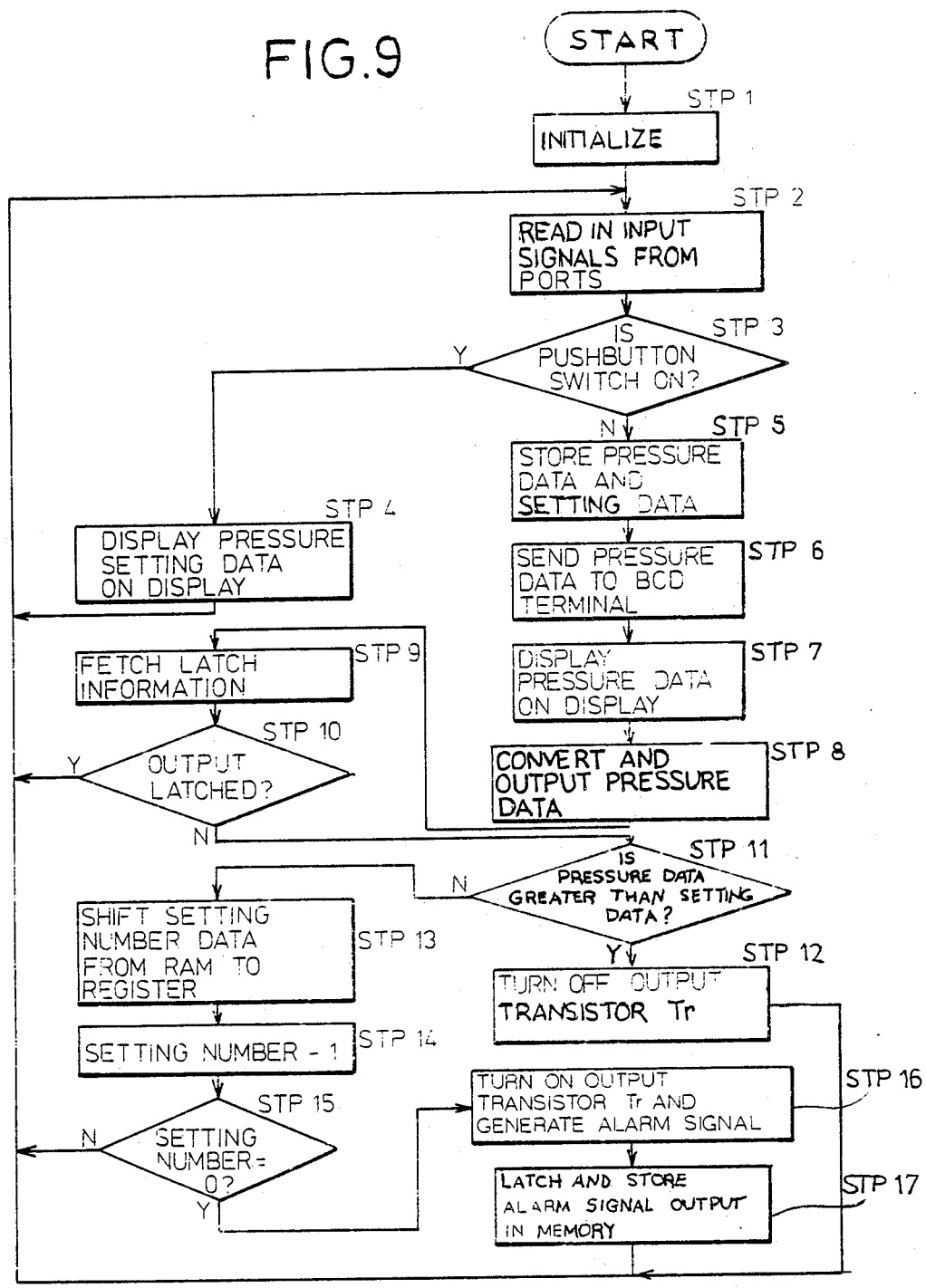
FIG. 9 is a flowchart of an operation sequence of the electric circuit illustrated in FIG. 7.
Figure 10:
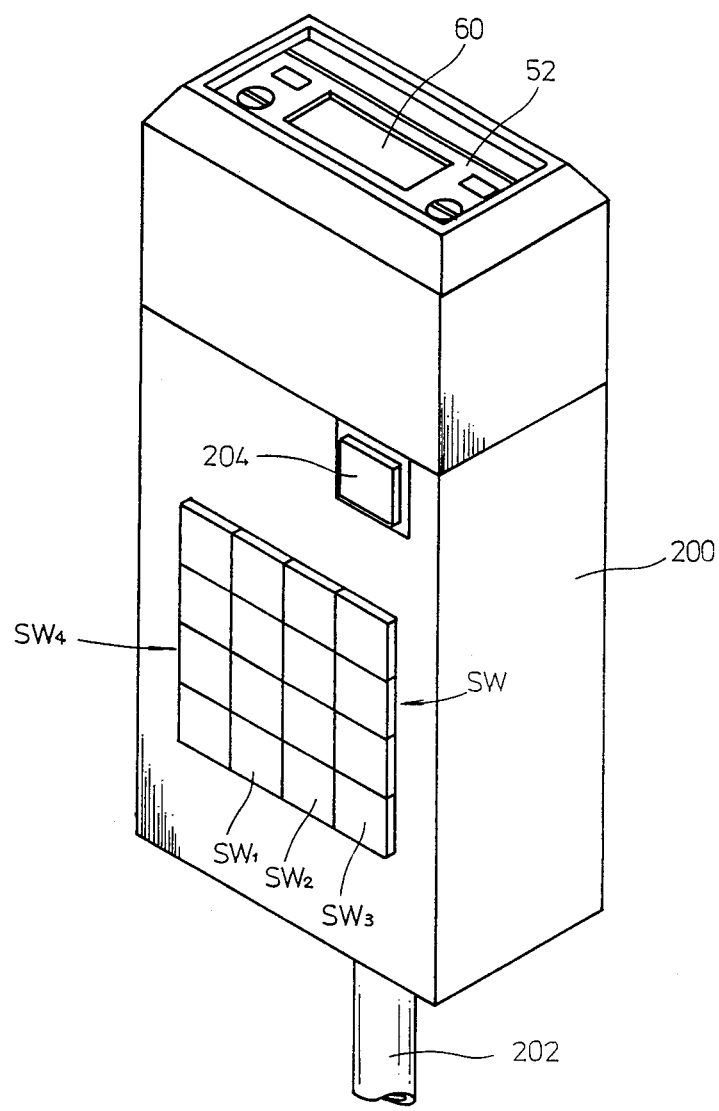
FIG. 10 is a perspective view of a pressure meter according to another embodiment of the present invention.

Operation of a control circuit composed of the microcomputer 124 will be described with reference to FIG. 9.

After initialization in a step 1, input signals are read in from the various input ports in a step 2. Then, a step 3 ascertains whether the pushbutton switch 62 is turned on or off. If turned on, then the pressure setting data established by the pressure switch is numerically displayed on the display 60 in a step 4. If turned off, then the fluid pressure data and the pressure setting data are stored in the RAM 170 in the microcomputer 124. More specifically, the analog output voltage VS from the operational amplifier A1 is converted to a digital voltage that is stored in the RAM 170, and the voltage setting from the variable resistor RV1 is stored at a different address in the RAM 170 at a step 5.

The pressure data stored in the RAM 170 is sent to the BCD serial output terminals OUTPUT1 in a step 6. The pressure data is also read out of the RAM 170 and displayed on the display 60 in a step 7. The digital pressure data is converted to an analog signal which is issued through the operational amplifier A1 to the output terminal OUTPUT2 in a step 8. Then, latch information that has been stored in the memory in a previous cycle is fetched in a step 9, and whether this output signal is latched or not ids determined in a step 10. If the output signal from an alarm terminal 176 is latched, then control goes to a routine in which the output data is displayed. If not, then step 11 ascertains whether the pressure data is greater than the pressure setting data. If the pressure data is greater than the pressure setting data, then an output transistor TR is turned off in a step 12. If the pressure data is smaller than the pressure setting data, then the setting number data is shifted from the RAM 170 to the register 170 in a step 13 in order to confirm that the pressure data is smaller than the pressure setting data for a prescribed period of time. The setting number data is decremented in a step 14. If the setting number data reaches 0 in a step 15, then the output transistor TR is turned on in a step 16. In this case, an alarm signal is issued through the terminal 176 to let the operator know that the pressure data is smaller than the pressure setting data. The alarm signal is latched and stored in the memory in a step 17. The operator now takes a suitable action such as stopping the actuator (not shown). If the pressure data is greater than the pressure setting data in the step 11, the output transistor TR is turned off in the step 12, and control returns to the step 2.

When the fluid under pressure is introduced from the passage 72 of the base 54 into the chamber 74, the pressure sensor 86 is pushed in the direction of the arrow (FIG. 5) by the fluid under pressure. The first printed-circuit board 92 to which output terminals 90 of the pressure sensor are joined is also pushed, and the inner cover 138 which holds the first printed-circuit board 92 through the engaging projections 143a through 143d and the outer cover 52 are also pushed in the direction of the arrow.

According to the illustrated embodiment, the base 54 has the wedges 84a through 84d inclined inwardly away from the outer cover 52, and the outer cover 52 has the hook members 160a through 160d engaging the wedges 84a through 84d, respectively. When the outer cover 52 is subjected to a fluid pressure tending to displace itself away from the base 54, the wedges 84a through 84d and the hook members 160a through 160d are firmly locked in mutual engagement, thus preventing the outer cover 52 from being detached from the base 54.

FIGS. 10 through 14 illustrate a pressure meter according to another embodiment of the present invention. The pressure meter of this embodiment is portable with a battery carried therein as a power supply. Those parts which are identical to those of the previous embodiment are denoted by identical reference numerals, and will not be described in detail.

The pressure meter 50 basically comprises a casing 200 housing a battery power supply and a flexible tube 202 inserted in a quick-connect coupling with a check valve (described later) for introducing a fluid under pressure through the coupling into the casing 200. The casing 200 supports on one surface a power supply switch 204 and key switches SW.

The pressure meter 50 has a side (not shown) to which there are connected a multicore cable (not shown) including a lead for supplying the power to the pressure meter 50 and a lead for supplying the power to the pressure meter 50 and a lead for leading pressure meter data from the pressure meter 50.

Figure 11:
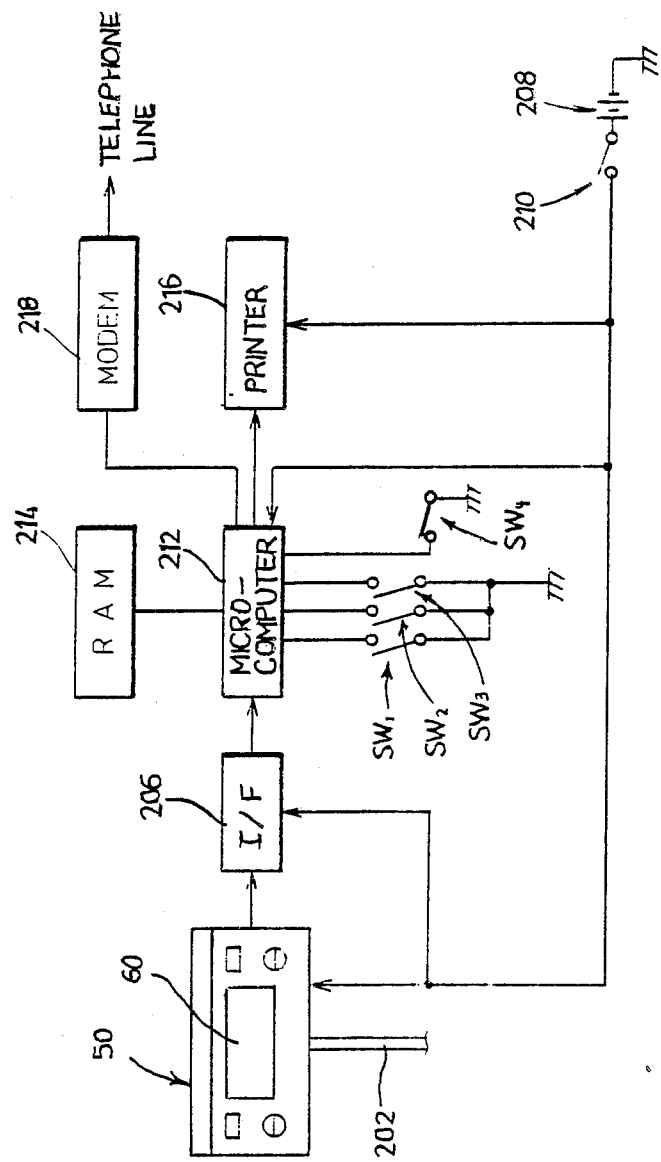
FIG. 11 is a block diagram of an electronic circuit in the pressure meter shown in FIG. 10.

As shown in FIG. 11, an output signal from the pressure meter 50 is supplied to an interface 206, and the pressure meter 50 is connected to a power supply battery 208 via a power supply switch 210. An output signal from the interface 206 is applied to a microcomputer 212, to which there are coupled an electronic memory 214 such as a RAM for storing measured pressures, a printer 216 for printing pressures, and a modem 218 for transferring pressure data through a telephone line to a host computer (not shown). These various components of the pressure meter 50 are connected to the battery 208 through the power supply switch 210. The microcomputer 212 has data input terminals connected to ganged key switches SW1 through SW3 for selecting one of a measuring mode, a memory mode, and a print mode, and ten-key switches SW4 for applying various items of information. The flexible tube 202 is attached to the quick-connect coupling with a check valve, which is denoted at 300 in FIG. 12.

Figure 12:
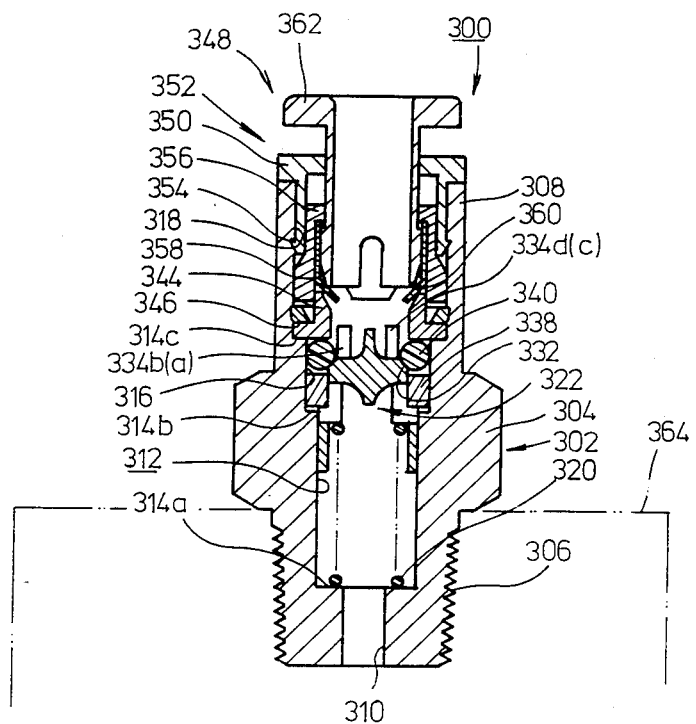
FIG. 12 is a vertical cross-sectional view of a quick-connect coupling with a check valve, with the pressure meter of FIG. 10 being mountable on the coupling.

As shown in FIG. 12, the coupling 300 includes a substantially cylindrical body 302 of unitary structure composed of a central hexagonal nut 304, a first cylindrical portion 306 extending below the nut 304 and having a threaded outer surface, and a second cylindrical portion 308 extending above the nut 304. The first cylindrical portion 306 is threadedly connected to a non-illustrated fluid pipe. The first cylindrical portion 306 has a first axial central hole 310 for introducing a fluid under pressure, and a second hole 312 of a slightly larger diameter having one end communicating with the first hole 310 at one end thereof through a first step 314a. the other end of the second hole 312 is held in communication with third and fourth holes 316, 318 of progressively greater diameters through second and third steps 314b, 314c.

Figure 13:
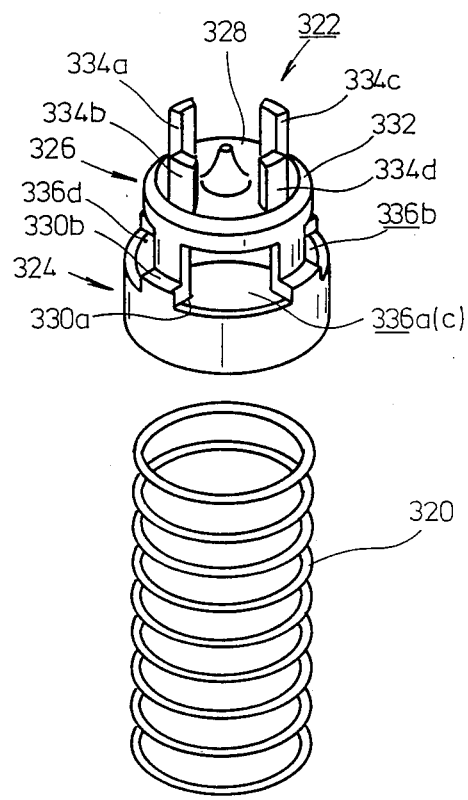
FIG. 13 is a perspective view of a valve body and a coil spring which are disposed in the quick-connect coupling shown in FIG. 12.

A coil spring 320 is mounted at one end thereof on the step 314a which defines the second hole 312. A valve body 322 is mounted on the other end of the coil spring 320. As shown in FIG. 13, the valve body 322 is substantially cylindrical in entire shape and comprises a larger-diameter ring-shaped member 324 and a smaller-diameter ring-shaped member 326. The smaller-diameter member 326 has a flat plate 328 with steps 330a, 330b formed between the flat plate 328 and the larger-diameter member 324. The flat plate 328 has a tapered surface 332 on its outer periphery. The valve body 322 has its outer peripheral wall axially recessed in its upper portion from the upper end thereof, leaving angularly equally spaced tongues 334a through 334d. The larger-diameter member 324 is partly recessed to define openings 336a through 336d below the flat plate 328.

As illustrated in FIG. 12, a ring-shaped spacer 338 is slidably disposed between the outer periphery of the smaller-diameter member 326 of the valve body 322 and the peripheral wall of the third hole 316 defined in the body 302. An O-ring 340 is disposed as a seal member above the spacer 338. The O-ring 340 is fitted over the tapered surface 332 of the flat plate 328 and has one end held against a flange 342 of a stopper 344. The stopper 344 is placed on the third step 314c and engages in a groove 346 defined in the peripheral wall of the fourth hole 318.

A tube connecting mechanism 348 is mounted in the body 302. The tube connecting mechanism 348 includes a guide member 352 having a flange 350 and an annular ridge 354 which is formed on the end of the outer periphery and mounted in the fourth hole 318. A collet 356 has one end fitted in the guide member 352, and a chuck 358 is fitted in the collet 356, the chuck 358 being urged radially inwardly by the collet 356. The chuck 358 has a tapered engaging portion 360 on one end thereof which is released from a penetrating condition when a release bushing 362 is pressed. The release bushing 362 has a hole 364 defined therein.

Operation and advantages of the pressure meter shown in FIGS. 10 through 14 will be described below.

The quick-connect coupling 300 is normally threaded in a fluid pipe 366 through which a fluid under pressure flows. As shown in FIG. 12, the valve body 322 is normally urged vertically upwardly under the resiliency of the coil spring 320 and the pressure of the fluid flowing through the fluid pipe. The O-ring 340 is fitted over the periphery of the tapered surface 132 of the valve body 322, and held against the stopper 344 in the body 302. As a result, the vavle body 322 is closed by the O-ring 340 and the flat plate 328 of the valve body 322.

Then, the power supply switch 210 of the pressure meter 50 is closed. The pressure meter proper, the interface 206, the microcomputer 212, the electronic memory 214, the printer 216, and the modem 218 are now energized, so that the pressure meter 50 can now be used. The switch SW1 is closed to select the measuring mode.

Figure 14:
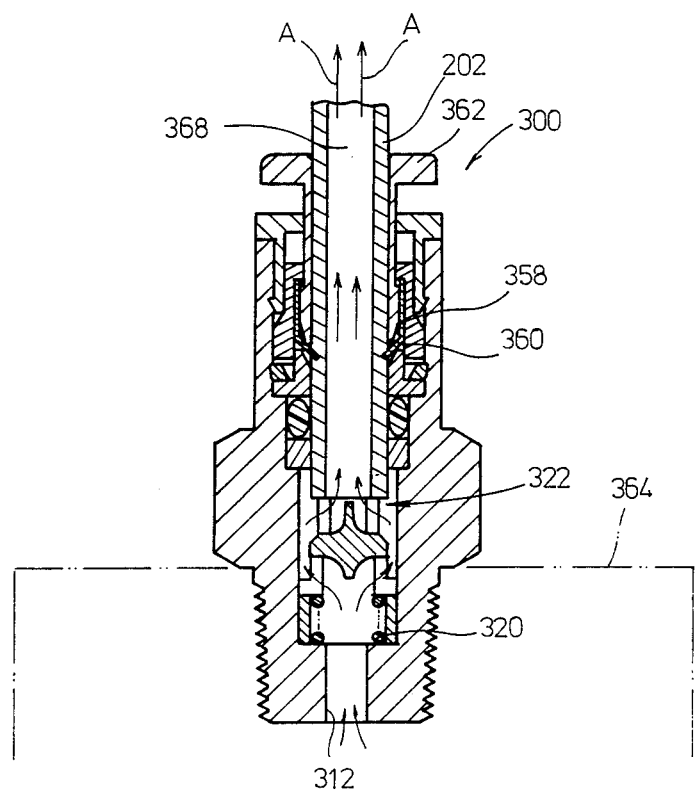
FIG. 14 is a fragmentary vertical cross-sectional view showing the manner in which a tube member of the pressure meter of FIG. 10 and the quick-connect coupling are joined to each other.

To measure the fluid pressure in the fluid pipe 366, the flexible tube 202 of the pressure meter 50 is inserted into the hole 364 of the coupling 300 which has been threaded in the fluid pipe 366. At this time, the end of the tube 202 depresses the valve body 322 toward the fluid pipe 366 while engaging the distal ends of the tongues 334a through 334d of the valve body 322. More specifically, the valve body 322 slides along the peripheral wall of the second hole 312 until the end of the larger-diameter member 324 abuts against the first step 314a. The tapered engaging portion 360 of the collet 356 now penetrates the tube 202 as shown in FIG. 14. Therefore, the tube 202 is securely retained against removal by the tube connecting mechanism 348. The fluid under pressure then flows through the first hole 310, the openings 336a through 336d of the valve body 322, and past the periphery of the flat plate 328 into the recesess between the tongues 334a through 334d, from which the fluid flows via a passage 368 in the tube 202 into the pressure meter 50 as indicated by the arrows A in FIG. 14.

The fluid pressure is displayed on the liquid crystal display 60 of the pressure meter 50. Then, the switch SW2 is closed to select the memory mode. A serial data signal from the pressure meter 50 is applied through the interface 206 and the microcomputer 212 and stored in the electronic memory 214. Thereafter, the switch SW3 is closed to select the print mode. The fluid pressure information stored in the electronic memory 214 is printed on a sheet of paper (not shown) by the printer 216. At this time, it is preferable that the ten-key switches SW4 should be used to apply a label input to indicate which coupling 300 the pressure data is concerned with. The pressure data stored in the memory 214 can also be transferred via the model 218 and the telephone line to the non-illustrated host computer.

With the arrangement of the present invention, as described above, the pressure of a fluid, which has heretofore been indicated by an analog representation, can be digitally displayed through a simple structure. Unlike conventional pressure meters employing Bourdon tubes or diaphragms, the pressure meter of the invention is simple in construction and small in size, and can be combined with a pressure switch in a unitary structure. Therefore, the area occupied by the pressure sensor is greatly reduced, allowing effective utilization of a space, and the pressure meter can easily be operated. Reading errors on the pressure meter are also reduced. A plurality of printed-circuit boards on which a pressure sensor in an inner cover and an electric circuit connected to the pressure sensor are disposed are engaged by locking members of the inner cover with connectors interposed therebetween. Consequently, it is not necessary to use leads to connect the printed-circuit boards, the number of parts required is reduced, and the procedure of assembling the pressure meter is greatly simplified, resulting in increased production efficiency. When any of the various components of the pressure meter fails during usage, hook members of the outer cover are disengaged to remove the outer cover for replacing the malfunctioning part with a new one. Thus, the maintenance procedure is simplified.

Pressure units on the pressure meter can successively switched or selected by connecting a variable resistor to a microcomputer and judging a voltage commensurate with the angle setting of the variable resistor. Threfore, the pressure units can easily be switched from the exterior by the user, for example. An analog pressure setting that can be established by turning various knobs and a preset pressure value can easily be visually checked, and the pressure setting can be digitally displayed. When the preset pressure of the fluid is lower than the pressure setting, a relay (not shown) connected to the output terminals OUTPUT1 is energized to stop the operation of an actuator, so that the pressure meter can double as a pressure switch.

The pressure meter is simple in structure and small in size though it has both a pressure meter function and a pressure switch function. The pressure meter of the invention can be operated as a small-size digital pressure meter by a battery, and may have a built-in printer. Therefore, the pressure of a fluid pressure device can be checked through a simple procedure. More specifically, the worker can carry the pressure meter and can measure the pressure of a fluid flowing through a fluid pipe by inserting a tube of the pressure meter into a quick-connect coupling with a check valve. Since the pressure can be printed at the same time that it is measured, pressure data items can be analyzed as desired based on statistical principles.

With a single pressure meter of the invention being used, it is not necessary to provide as many pressure meters as the number of locations where the fluid pressure needs to be checked. Accordingly, a low-cost pressure measuring system can be established.

Although certain preferred embodiments have been shown and described, it should be understood that many changes and modifications may be made therein without departing from the scope of the appended claims.

What is claimed is:

1. A pressure meter comprising: a casing; a semiconductor pressure sensor disposed in said casing; a passage for introducing a fluid under pressure to said pressure sensor; a display mounted on one side of said casing for displaying a fluid pressure; means for picking up the fluid pressure sensed by said semiconductor pressure sensor as an electric signal, for converting the electric signal to a digital signal, and for displaying the digital signal as a digital value on said display; and setting means for setting a pressure value for the fluid under pressure.

2. A pressure meter according to claim 1, wherein said means includes means for picking up the electric signal as an analog signal, and for utilizing the analog signal as a control signal and/or an alarm signal with respect to the fluid under pressure when the analog signal is higher or lower than a prescribed value.

3. A pressure meter according to claim 1, wherein said display comprises means for displaying the pressure value set by said setting means.

4. A pressure meter according to claim 3, wherein said setting means includes an analog display, whereby an analog value displayed on said analog display and the digital value of the fluid pressure can be visually checked.

5. A pressure meter according to claim 1, wherein said casing has at least a cover assembly and a base, said semiconductor pressure sensor being mounted on said base, said base having a passage for introducing the fluid under pressure into said semiconductor pressure sensor.

6. A pressure meter according to claim 5, further including printed-circuit boards supporting an electric circuit and housed in said casing, said semiconductor pressure sensor having output terminals directly holding said printed-circuit board.

7. A pressure meter according to claim 6, wherein said semiconductor pressure sensor is displaceable in said casing under the pressure of the fluid introduced through said passage.

8. A pressure meter according to claim 5, wherein said cover assembly substantially comprises an inner cover and an outer cover, further including printed-circuit boards and electronic circuit components connected to said semiconductor pressure sensor, said inner cover supporting said printed-circuit boards and said electronic circuit components, said outer cover surrounding said inner cover and supporting said display.

9. A pressure meter according to claim 8, wherein said outer cover engages said base and houses said semiconductor pressure sensor, said inner cover, said printed-circuit boards, and said electronic circuit components.

10. A pressure meter according to claim 9, wherein said base has first engaging means and said outer cover has second engaging means, said first and second engaging means engaging each other to detachably connect said outer cover and said base.

11. A pressure meter according to claim 10, wherein said second engaging means is displaceable into locking engagement with said first engaging means when said second engaging means is displaced upon displacement of said semiconductor pressure sensor on said base.

12. A pressure meter according to claim 10, wherein said base is in the form of a box, said first engaging means comprises wedges directed inwardly of said base, said second engaging means comprising ridges directed outwardly from said outer cover in engagement with said wedges.

13. A pressure meter according to claim 10, wherein said inner cover has a plurality of fingers engaging at least one of said printed-circuit boards.

14. A pressure meter according to claim 13, wherein said inner cover has supporting projections for supporting and positioning the printed-circuit boards engaged by said fingers.

15. A pressure meter according to claim 1, further including a variable resistor adjustable from the exterior and having a slidable terminal and fixed terminals between which a DC voltage is applied, the arrangement being such that output voltages produced from said slidable terminal by adjusting said variable resistor are weighted according to units of pressure, and the units of pressure are selectively displayed digitally on said display for the respective output voltages.

16. A pressure meter according to claim 15, further including a battery for supplying electric power to said pressure meter, said battery and said pressure meter being combined in an unitary structure.

17. A pressure meter according to claim 15, further including an electronic memory, said electronic memory and said pressure meter being combined in an unitary structure.

18. A pressure meter according to claim 15, further including a printer, said printer and said pressure meter being combined in an unitary structure.

19. A pressure meter according to claim 15, further including a modem, said modem and said pressure meter being combined in an unitary structure.

* * * * *